US012457392B2

(12) United States Patent
Miyata et al.

(10) Patent No.: US 12,457,392 B2
(45) Date of Patent: Oct. 28, 2025

(54) IMAGING DEVICE AND OPTICAL ELEMENT

(71) Applicant: NTT, Inc., Tokyo (JP)

(72) Inventors: Masashi Miyata, Musashino (JP); Yoko Sogabe, Musashino (JP); Fumihide Kobayashi, Musashino (JP); Shiori Sugimoto, Musashino (JP); Naru Nemoto, Musashino (JP); Toshikazu Hashimoto, Musashino (JP)

(73) Assignee: NTT, Inc., Tokyo (JP)

( * ) Notice: Subject to any disclaimer, the term of this patent is extended or adjusted under 35 U.S.C. 154(b) by 154 days.

(21) Appl. No.: 18/273,228

(22) PCT Filed: Jan. 27, 2021

(86) PCT No.: PCT/JP2021/002910
§ 371 (c)(1),
(2) Date: Jul. 19, 2023

(87) PCT Pub. No.: WO2022/162801
PCT Pub. Date: Aug. 4, 2022

(65) Prior Publication Data
US 2024/0121488 A1    Apr. 11, 2024

(51) Int. Cl.
H04N 23/12    (2023.01)
H04N 23/45    (2023.01)
(Continued)

(52) U.S. Cl.
CPC ............ H04N 23/12 (2023.01); H04N 23/45 (2023.01); H04N 23/55 (2023.01); H04N 23/56 (2023.01); H04N 23/84 (2023.01)

(58) Field of Classification Search
CPC ........ H04N 23/12; H04N 23/45; H04N 23/55; H04N 23/56; H04N 23/84; G01J 3/2823;
(Continued)

(56) References Cited

U.S. PATENT DOCUMENTS

2010/0097702 A1* 4/2010 Menon .................. G06T 3/4053
359/559
2010/0304546 A1 12/2010 Ogawa et al.
(Continued)

FOREIGN PATENT DOCUMENTS

JP    2018-107794    7/2018
JP    2020-123964    8/2020
(Continued)

OTHER PUBLICATIONS

Arce et al., "Compressive Coded Aperture Spectral Imaging: An introduction" IEEE Signal Processing Magazine, Jan. 2014, 31(1):105-115, 11 pages.
(Continued)

Primary Examiner — Abdelaaziz Tissire
(74) Attorney, Agent, or Firm — Fish & Richardson P.C.

(57) ABSTRACT

An imaging device includes an optical element including a transparent substrate and a plurality of structures disposed on or in the transparent substrate in a plane direction of the transparent substrate, an imaging sensor in which a plurality of pixels each including a photoelectric conversion element are arranged, and a signal processing unit configured to generate an image signal based on an electric signal obtained from the imaging sensor, wherein the optical element outputs light with a different point spread function for each wavelength to form, on the imaging sensor, an image in which the point spread function of each wavelength is convoluted, the plurality of structures have the same height in a side view, and the signal processing unit reconstructs an image in which the point spread function of each wavelength is convoluted.

7 Claims, 30 Drawing Sheets

(51) Int. Cl.
  *H04N 23/55* (2023.01)
  *H04N 23/56* (2023.01)
  *H04N 23/84* (2023.01)
(58) Field of Classification Search
  CPC ....... G01J 3/0205; G06N 3/02; G06N 3/0464; H10F 39/80
  See application file for complete search history.

(56) References Cited

U.S. PATENT DOCUMENTS

| | | | |
|---|---|---|---|
| 2016/0316180 A1* | 10/2016 | Han | G02B 13/0035 |
| 2017/0023803 A1* | 1/2017 | Han | G02F 1/015 |
| 2017/0034500 A1* | 2/2017 | Arbabi | H10F 39/8063 |
| 2018/0039102 A1* | 2/2018 | Baik | G06F 30/17 |
| 2018/0184052 A1 | 6/2018 | Sato et al. | |
| 2018/0270413 A1* | 9/2018 | Sakashita | H04N 23/13 |
| 2018/0286906 A1* | 10/2018 | Sato | H10F 39/182 |
| 2018/0338049 A1* | 11/2018 | Wachi | H04N 23/55 |
| 2019/0162592 A1 | 5/2019 | Khorasaninejad et al. | |
| 2019/0333199 A1 | 10/2019 | Ozcan et al. | |
| 2020/0266230 A1 | 8/2020 | Miyata et al. | |
| 2020/0301053 A1 | 9/2020 | Wang et al. | |
| 2021/0037219 A1* | 2/2021 | Colburn | G02B 5/1871 |
| 2021/0125301 A1* | 4/2021 | Park | G06T 1/0007 |
| 2021/0127101 A1* | 4/2021 | Roh | H04N 23/55 |
| 2021/0333151 A1 | 10/2021 | Miyata et al. | |
| 2021/0392252 A1* | 12/2021 | Wang | G03B 19/22 |
| 2024/0147032 A1* | 5/2024 | Miyata | G06N 3/02 |

FOREIGN PATENT DOCUMENTS

| | | |
|---|---|---|
| KR | 10-2020-0029572 A | 3/2020 |
| WO | WO 2019148200 | 8/2019 |
| WO | WO 2020/066738 | 4/2020 |

OTHER PUBLICATIONS

Sogabe et al., "ADMM-Inspired Reconstruction Network for Compressive Spectral Imaging," 2020 IEEE International Conference on Image Processing (ICIP), Abu Dhabi, United Arab Emirates, Oct. 25-28, 2020, 2865-2869, 5 pages.

Jeon et al., "Compact Snapshot Hyperspectral Imaging with Diffracted Rotation," ACM Trans. Graph., Jul. 2019, 38(4):117, 13 pages.

* cited by examiner

INPUT SPECTRAL IMAGE:
ACTUAL IMAGE
(128 × 128 × 25)

IMAGE AFTER CONVOLUTION:
OBSERVATION IMAGE
(128 × 128 × 3: COMPRESSION
RATIO OF 12%)

ACTUAL IMAGE

RESTRUCTURED IMAGE
(PSNR=29.09dB/SSIM=
0.9142/SAM=0.1872)

Fig. 23

|  | N=1 | N=2 | N=3 | N=4 | Fresnel |
|---|---|---|---|---|---|
| PSNR(dB) | 29.04 | 29.11 | 29.09 | 29.16 | 27.61 |
| SSIM | 0.9186 | 0.9194 | 0.9142 | 0.9037 | 0.8768 |
| SAM | 0.1895 | 0.1862 | 0.1872 | 0.1841 | 0.2972 |

IMAGING DEVICE AND OPTICAL ELEMENT

CROSS-REFERENCE TO RELATED APPLICATIONS

This application is a National Stage application under 35 U.S.C. § 371 of International Application No. PCT/JP2021/002910, having an International Filing Date of Jan. 27, 2021.
The disclosure of the prior application is considered part of the disclosure of this application, and is incorporated by reference in its entirety into this application.

TECHNICAL FIELD

The present invention relates to an imaging device and an optical element.

BACKGROUND ART

An imaging device generally acquires two-dimensional images of which obtainable optical information includes three colors including red (R), green (G), and blue (B). In this regard, hyperspectral cameras have been put into practical use in recent years as cameras for acquiring more detailed color information (wavelength spectrum), and efforts have been made to extract information with new values from more various optical information. In general, a line scan-type camera is known as a hyperspectral camera which has been put into practical use. In addition, research on a compressive sensing-type hyperspectral camera has progressed.

CITATION LIST

Non Patent Literature

[NPL 1] Gonzalo R. Arce, David J. Brady, Lawrence Carin, Henry Arguello, and David S. Kittle, "Compressive Coded Aperture Spectral Imaging: An introduction", IEEE Signal Processing Magazine, Vol. 31, No. 1, pp. 105-115, 2013.
[NPL 2] Y. Sogabe, et al. "ADMM-INSPIRED RECONSTRUCTION NETWORK FOR COMPRESSIVE SPECTRAL IMAGING", In: 2020 IEEE International Conference on Image Processing (ICIP). IEEE, 2020. p. 2865-2869.

SUMMARY OF INVENTION

Technical Problem

A line scan-type hyperspectral camera allows only spatial one-dimensional light to be incident through a slit, and performs wavelength separation with a spectroscopic element (a prism or grating) to acquire a spatial one-dimensional×wavelength one-dimensional image with a two-dimensional imaging sensor. A line scan-type hyperspectral camera generates a spatial two-dimensional×wavelength one-dimensional image by photographing a position of the slit (or the imaging target itself) a plurality of times while scanning the position.
In the case of the line scan-type, wavelength information is acquired directly through wavelength separation performed using a spectroscopic element, and thus there is an advantage that accuracy in the wavelength spectrum is high.

On the other hand, such a line scan-type hyperspectral camera has disadvantages in that the camera increases in size due to a long optical path length required for wavelength separation and a scanning mechanism and has a low temporal resolution due to a plurality of photographing operations (it is not possible to image a moving body).
A compressive sensing-type hyperspectral camera performs optical encoding (manipulation and calculation of optical information) and performs imaging on an imaging target, and restores spatial information and wavelength information using a reconstruction process by using sparsity of natural images.
Since the compressive sensing-type hyperspectral camera restores original information with high accuracy from a small amount of information, it has an advantage that it generally operates in a single shot in addition to having a small amount of loss in the amount of information (without sacrificing spatial and time dimensions), compared to the other methods mentioned above. On the other hand, a compressive sensing-type hyperspectral camera generally requires a large-scale and complicated optical system for optical encoding, and thus it has disadvantages such as a large number of manufacturing steps and a large device size. Further, although it is also possible to perform encoding with a simplified optical system using a multi-stage diffraction optical element requiring multi-stage lithography, the number of manufacturing steps increases, and there are restrictions on the light transmittance and the number of apertures (or the F number) of the optical system due to the principle restrictions (shadow effects, etc.).
The present invention has been conceived in consideration of the above situation and aims to provide a hyperspectral imaging device having a simple device configuration and an optical element for realizing such a hyperspectral imaging device having a simple device configuration.

Solution to Problem

In order to solve the above-mentioned problem and achieve the objective, an imaging device according to the present invention includes an optical element including a transparent substrate and a plurality of structures disposed on or in the transparent substrate in a plane direction of the transparent substrate; an imaging sensor in which a plurality of pixels each including a photoelectric conversion element are arranged; and a signal processing unit configured to generate an image signal based on an electric signal obtained from the imaging sensor, wherein the optical element outputs light with a different point spread function for each wavelength to form, on the imaging sensor, an image in which the point spread function of each wavelength is convoluted, the plurality of structures have the same height in a side view, and the signal processing unit reconstructs an image in which the point spread function of each wavelength is convoluted.
Furthermore, an optical element according to the present invention is an optical element including a transparent substrate; and a plurality of structures disposed on or in the transparent substrate in a plane direction of the transparent substrate, the optical element configured to output light with a different point spread function for each wavelength to form, on an imaging sensor, an image in which the point spread function of each wavelength is convoluted, wherein the plurality of structures have the same height in a side view.

Advantageous Effects of Invention

According to the present invention, a hyperspectral imaging device having a simple device configuration can be realized.

BRIEF DESCRIPTION OF DRAWINGS

FIG. 23 is a diagram showing the results of comparison of the reconstruction accuracy according to the shapes of the PSF of an optical element 12.

DESCRIPTION OF EMBODIMENTS

Figure 1:
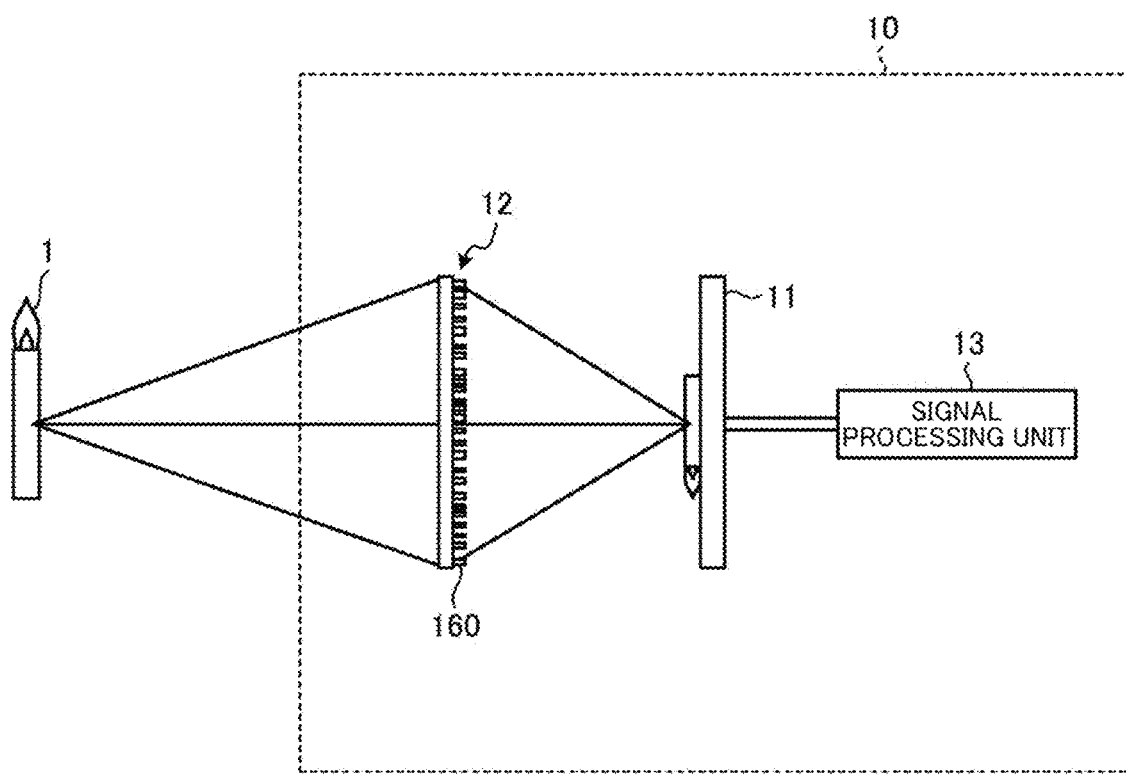
FIG. 1 is a side view showing a schematic configuration of an imaging device according to an embodiment.

The best mode for carrying out the present invention will be described in detail below with reference to the drawings. Note that, in the following description, each drawing merely schematically shows shapes, sizes, and positional relationships to the extent that the content of the present invention can be understood, and thus, the present invention is not limited only to the shapes, sizes, and positional relationships exemplified in each drawing. Furthermore, in the description provided with reference to the drawings, the same constituent portions are denoted by the same reference numerals. Further, in the following, the denotation "^A" for A is intended to be equivalent to a "symbol with '^' directly above 'A'".

Embodiment

Figure 2:
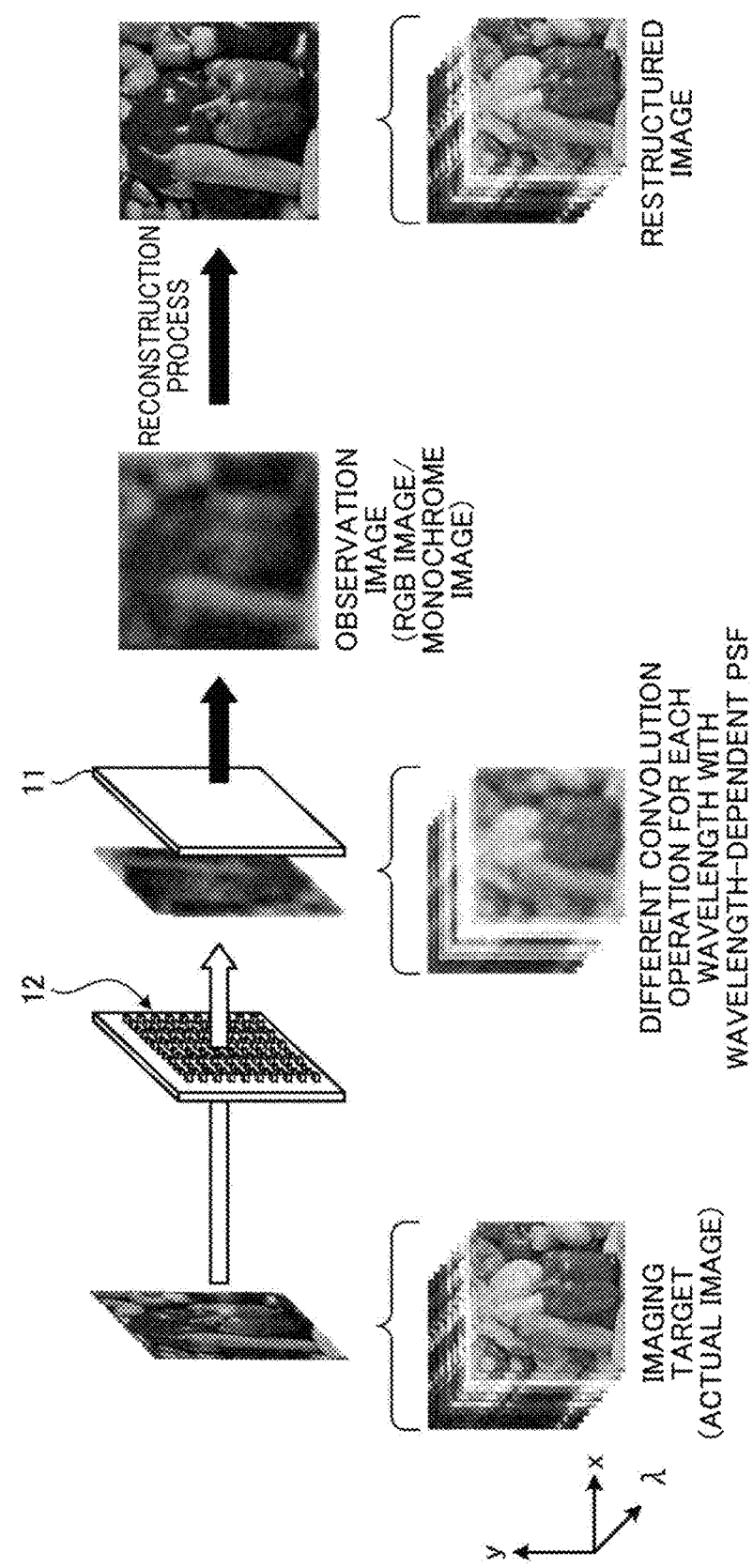
FIG. 2 is a schematic diagram showing processing performed until the imaging device illustrated in FIG. 1 acquires an image.

[Imaging Device] First, an imaging device according to an embodiment of the present invention will be described. FIG. 1 is a side view illustrating a schematic configuration of the imaging device according to the embodiment. FIG. 2 is a schematic diagram showing processing performed until the imaging device 10 illustrated in FIG. 1 acquires an image.

The imaging device 10 according to the embodiment includes an optical element 12, an imaging sensor 11, and a signal processing unit 13 as illustrated in FIG. 1. The imaging sensor 11 has a photoelectric conversion element such as a CCD or a CMOS. The signal processing unit 13 processes a photoelectric conversion signal output from the imaging sensor 11 to generate an image signal.

The imaging device 10 radiates light such as natural light or illumination light to an imaging target (actual image), and light transmitted/reflected/scattered from the imaging target 1 or light emitted from the imaging target 1 forms an optical image on the imaging sensor 11 through the optical element 12 as illustrated in FIGS. 1 and 2.

The optical element 12 has a fine binary structure. In other words, the optical element 12 has a plurality of fine columnar structures 160. Thus, the optical element 12 performs optical encoding with a function in which imaging characteristics differ depending on wavelengths. The optical element 12 is a lens (wavelength-dependent point spread function (PSF) lens) having a PSF with a clearly different shape depending on a wavelength, and has a function of generating an image obtained by applying a different convolution operation for each wavelength to an actual image (subject). The optical element 12 is a wavelength-dependent PSF lens, and when an object is imaged by the optical element 12, a convolution operation is performed on an actual image by using a different PSF for each wavelength, and the resulting image is formed on the imaging sensor.

The imaging sensor 11 acquires an observation image on which a different convolution operation is performed by the optical element 12 that is a wavelength-dependent PSF lens for each wavelength. The signal processing unit 13 generates a spectral image by performing processing for reconstructing spatial information and spectrum information of the subject from the observation image based on compressive sensing.

Further, although the imaging device 10 may include known constituent elements such as an infrared light-cutting optical filter, an electronic shutter, a viewfinder, a power supply (battery), and a flashlight, description thereof is omitted because they are not particularly necessary for understanding the present invention. In addition, the foregoing configuration is merely exemplary, and known elements may be properly used in combination as constituent elements in place of the optical element 12, the imaging sensor 11, and the signal processing unit 13.

[Lens and Imaging Sensor] Next, an overview of the optical element 12 and the imaging sensor 11 according to the embodiment will be described. The imaging sensor 11 is formed such that a plurality of pixels each including a photoelectric conversion element are placed in a two-dimensional array. The optical element 12 has a different PSF for each wavelength, and has a plurality of fine structures having the function of forming an image with the different PSF for each wavelength convoluted with respect to an actual image on the imaging sensor 11, the structures being arrayed all over the surface.

Figure 3:
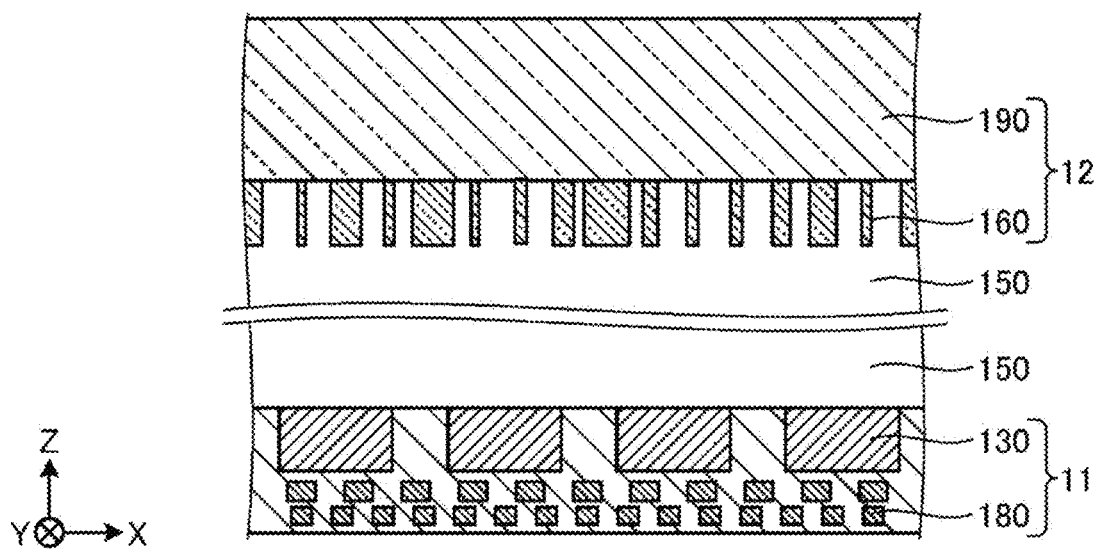
FIG. 3 is a diagram schematically illustrating a part of a cross section of an imaging sensor and an optical element according to the embodiment.

FIG. 3 is a diagram schematically illustrating a part of a cross section of the imaging sensor and the optical element according to the embodiment. In addition, in FIG. 3 and subsequent drawings, an xyz coordinate system is shown. The x-y plane direction corresponds to the plane direction of the imaging sensor 11, a transparent substrate 190, and the like, which will be described later. Hereinafter, "plan view" indicates that an image is viewed in the z-axis direction (for example, in the z-axis negative direction) unless otherwise specified. "Side view" indicates that an image is viewed in the x-axis direction or the y-axis direction (for example, in the y-axis negative direction).

As illustrated in FIG. 3, the optical element 12 is disposed to face the imaging sensor 11. The imaging sensor 11 and the optical element 12 are provided in that order in the z-axis positive direction.

The imaging sensor 11 has a wiring layer 180 and a plurality of pixels 130 arranged in the x-y plane direction. Each pixel 130 includes a photoelectric conversion element. An example of the photoelectric conversion element is a photodiode (PD). Each pixel corresponds to red (R), green (G), and blue (B). When $\lambda_0$ indicates wavelength, in an example of the wavelength band of red light, 600 nm<$\lambda_0$≤800 nm. In an example of the wavelength band of green light, 500 nm<$\lambda_0$≤600 nm. In an example of the wavelength band of blue light, $\lambda_0$≤500 nm. The pixels R, G and B may be in a Bayer array. Alternatively, the pixels may be used for monochrome images.

The incident light advances in the z-axis negative direction and reaches the imaging sensor 11 via the optical element 12. Charges generated in each pixel of the imaging sensor 11 are converted into an electric signal to be a base of a pixel signal by a transistor, which is not illustrated, or the like, and output to the outside of an imaging unit 100 through the wiring layer 180. In FIG. 3, some of the wirings included in the wiring layer 180 are illustrated.

The optical element 12 is arranged on the side on which light from an imaging target is incident. In plan view, the optical element 12 is provided to cover the imaging sensor 11. The optical element 12 is composed of a plurality of structures 160 on the bottom surface of a transparent substrate 190, for example, in a periodic manner (having a periodic structure). The plurality of structures 160 may be disposed at equal intervals to facilitate design or the like, or disposed at unequal intervals. The plurality of structures 160 are formed in a transparent layer 150 formed on the imaging sensor 11 to cover the plurality of pixels.

The transparent substrate 190 is a transparent substrate having a low refractive index made of a material, for example, $SiO_2$ (having a refractive index n of 1.45). The transparent layer 150 is a transparent layer made of materials with a low refractive index such as air or $SiO_2$. The transparent substrate 190 and the transparent layer 150 may be made of a single material, or a plurality of materials may be layered. The plurality of structures 160 are formed at the same height in a side view. The plurality of structures 160 have microstructure patterns made of a material such as SiN or $TiO_2$ having a higher refractive index than the transparent layer 150.

An example of the optical element 12 is a meta-surface. The meta-surface includes a plurality of micro-structures (corresponding to the structures 160) having the same height in a side view while having a width equal to or less than a wavelength of light in a plan view. Each cross-sectional shape of the plurality of structures 160 when it is cut on a plane parallel to the x-y plane is a four-time rotationally symmetrical shape. Further, the meta-surface may have a two-dimensional structure or a three-dimensional structure. The optical element 12 controls phase and light intensity according to characteristics of light (wavelength, polarization, and incidence angle) only by changing parameters of the structures 160. In the case of a three-dimensional structure, the degree of freedom in design is improved more than that of a two-dimensional structure.

The optical element 12 has a different PSF depending on wavelengths, and thereby, image forming characteristics (a degree of blur) differ depending on the wavelengths of light from the imaging target 1. Light from the imaging target 1 is imaged on the imaging sensor 11 by the optical element 12 having a wavelength-dependent PSF function, and is acquired as an image (an RGB image or a monochrome image).

The acquired image corresponds to the result obtained by performing an optical convolution operation for each wavelength by the wavelength-dependent PSF of the optical element 12 for the imaging target (actual image) 1 and integrated in the wavelength dimension on pixels. The optical element 12 and the imaging sensor 11 acquire an image in an optically encoded and compressed state. Further, in the case in which the imaging sensor 11 is a color image sensor, after the convolution operation, each of R, G, and B pixels of the imaging sensor 11 is multiplied according to the wavelength sensitivity thereof, and then they are integrated in the wavelength dimension on the pixels.

In this way, in the imaging device 10, an optically encoded image is formed on the imaging sensor 11 with one optical element 12 (optical element 12). In other words, in the imaging device 10, effective encoding can be performed in spectral image reconstruction with one optical element 12 (optical element 12). For this reason, the constituent elements of the imaging device 10 may only be one optical element 12 and the imaging sensor 11 and can realize a hyperspectral imaging device as a simple device.

Furthermore, since the distance between the optical element 12 and the imaging sensor 11 is determined based on the focal length of the lens in the imaging device 10, similarly to a normal imaging device, the size of the imaging device 10 is equivalent to that of a normal camera with the same field-of-view F number.

Then, the optically encoded image is subject to appropriate signal processing by the signal processing unit 13 when an observation process is known (here, wavelength sensitivity characteristics of a PSF of the optical element 12 and a sensor), and thus information of the actual image can be restored.

The imaging device 10 performs signal processing by using compressive sensing which is a method for reconstructing (restoring) a target from a small amount of information with high accuracy particularly by using sparsity of a natural image. Since the imaging device 10 can perform different encoding for each wavelength component of the actual image with the wavelength-dependent PSF of the optical element 12, the signal processing unit 13 can restore the spectral image by performing image reconstruction processing based on compressive sensing.

Figure 4:
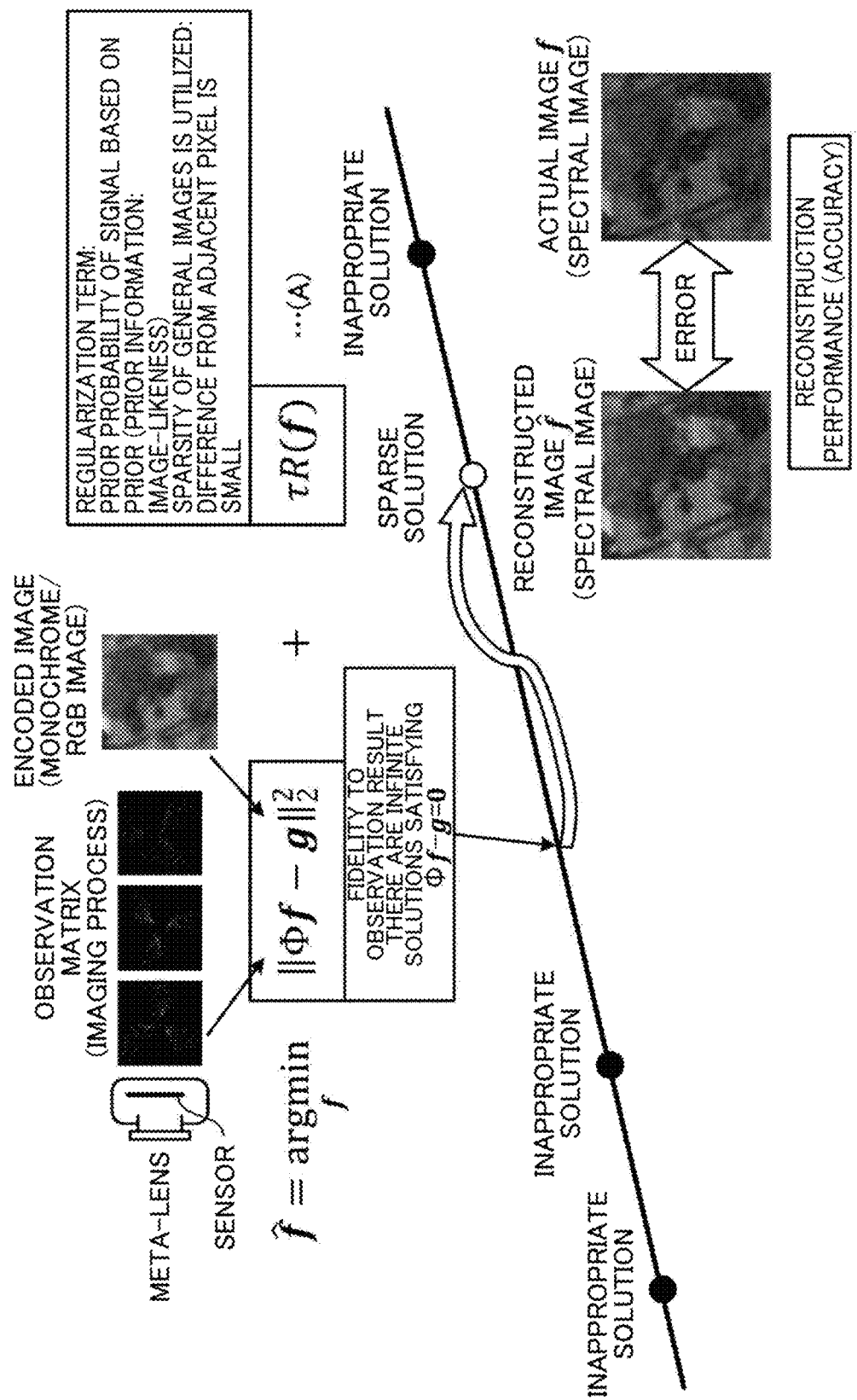
FIG. 4 is a diagram for describing reconstruction processing of an image by a signal processing unit.

[Image Reconstruction Processing] The signal processing unit 13 performs image reconstruction based on a matrix defined by an imaging process of the optical element 12 and an image formed on the imaging sensor 11, that is, an image (observation image) in which a PSF of each wavelength is convoluted. FIG. 4 is a diagram for describing reconstruction processing for an image by the signal processing unit 13.

As shown in FIG. 4, the reconstruction processing is processing for solving an optimization problem (for example, the expression (A) in FIG. 4) in which an observation matrix $\Phi$ defined by the optical system and the acquired encoded image g are input.

In the expression (A), f in the first term on the right side indicates an image that is intended to be restored. Since the number of pieces of data of the observation image is remarkably smaller than the number of pieces of data of the image to be restored (reconstructed image), there are numerous solutions satisfying $\Phi f - g = 0$, but by adding the normalization term as the second term, it is easy to obtain an image that is likely as a restored image (reconstructed image ^f).

Various normalization terms have been proposed for spectral images, and this embodiment can be applied to any of the normalization terms. In the example of the expression (A), R corresponds to a prior probability of a signal based on prior (prior information: image-likeness), and sparsity that is general to images such as a small difference from an adjacent pixel is used. Here, $\tau$ is a balancing parameter. Further, in the present embodiment, a normalization term called Spatio-Spectral Total Variation (SSTV) (Reference 1) will be used, and image reconstruction is optimized so as to minimize the difference between adjacent pixels in the spatial dimension and the wavelength dimension.

Reference 1: Aggarwal, H. K., & Majumdar, A. (2016). Hyperspectral Image Denoising Using Spatio-Spectral Total Variation. IEEE Geoscience and Remote Sensing Letters, 13(3), 442-446.

Various methods have been proposed for solving the optimization problem. In the present embodiment, for example, a technique called Alternating Direction Method of Multipliers (ADMM) (Reference 2) is used. In addition, in recent years, there has been proposed a method of simultaneously optimizing parameters of a regularization term and an optimization problem using machine learning or the like and reconstructing an image (see NPL 2). This method can be applied to the signal processing unit 13. That is, the signal processing unit 13 may reconstruct a spectral image by using a model composed of a neural network and an optimized reconstruction algorithm. In other words, the signal processing unit 13 learns the shape of the regularization term and various parameters of the optimization problem in advance by using various spectral images through machine learning and reconstructs the image using the learned (optimized) regularization term and various parameters.

Reference 2: S. Boyd, N. Parikh, E. Chu, B. Peleato, and J. Eckstein, "Distributed Optimization and Statistical Learning via the Alternating Direction Method of Multipliers", Foundations and Trends in Machine Learning", vol. 3, No. 1, pp. 1-122, 2011.

As described above, in the imaging device 10, the observation matrix $\Phi$ that is effective for reconstruction can be realized with a simple and compact optical system (the optical element 12).

[Structure] In order to realize the structure 160, by designing a cross-sectional shape of the fine columnar structure 160 to design an arbitrary spatial phase distribution in the present embodiment, the optical element 12 having a PSF function having different shapes depending on each wavelength of incident light is realized.

Figure 5:
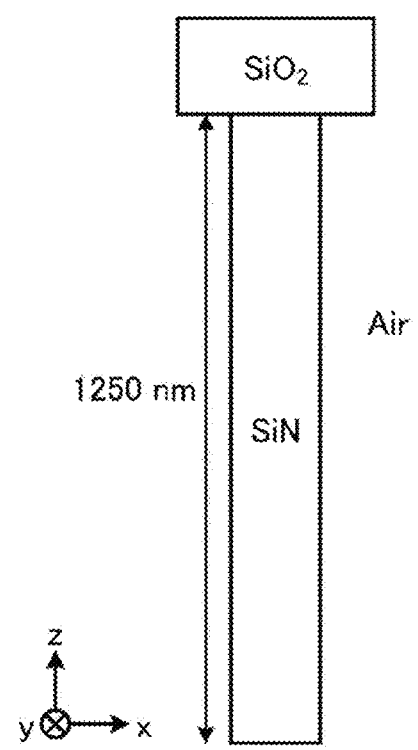
FIG. 5 is a diagram illustrating an example of a schematic configuration of a structure.
Figure 6:
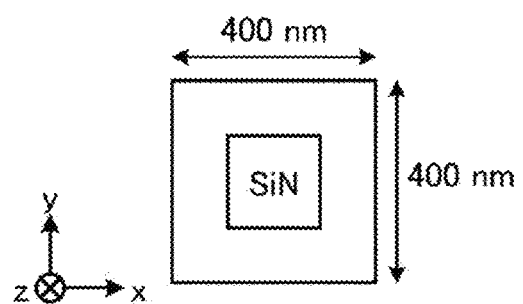
FIG. 6 is a diagram illustrating an example of a schematic configuration of a structure.

FIGS. 5 and 6 are diagrams illustrating an example of a schematic configuration of the structure 160. FIG. 5 is a side view of the structure 160 having a square shape in plan view. FIG. 6 is a bottom view of the structure 160 illustrated in FIG. 5.

The structure 160 is a columnar structure extending in the z-axis direction, and is formed on the bottom surface of the transparent substrate 190 (for example, an $SiO_2$ substrate (having a refractive index of 1.45)). An example of materials of the structure 160 is SiN (having a refractive index $n_1 = 2.05$). The side and the lower part of the structure 160 has air (having a refractive index $n_0 = 1.0$).

The arrangement cycle of the structures 160 is assumed to be P. It is desirable to set the arrangement cycle P as expressed by the formula (1) so that no diffracted light is generated on the transmission side.

[Math. 1]

$$P \leq \lambda_{min}/n_0 \qquad (1)$$

$\lambda_{min}$ is the shortest wavelength in the wavelength band of a light receiving object. $n_0$ is the refractive index of a transparent layer on the transmission side. For example, $\lambda_{min}$ is set to 420 nm, no is set to 1.0, and P is set to 400 nm.

A height h (height in the z-axis direction) of the structure 160 is constant. Since it is preferable that the structure 160 has an amount of optical phase delay (phase value) of $2\pi$ or more with respect to incident light, that is, light traveling along the z-axis direction, the height h desirably is set as in the formula (2) when a desired center wavelength in the wavelength region on the longest wavelength side of a wavelength region to be separated is set to $\lambda_r$.

[Math. 2]

$$h \geq \lambda_r/(n_1 - n_0) \qquad (2)$$

In the formula (2), $n_1$ is a refractive index of the structure 160. When the structure 160 is formed of SiN, $n_1=2.05$ is satisfied, and the height h is 1250 nm, for example. In addition, the structure 160 may be formed of TiN (having a refractive index of 2.40).

By designing the cross-sectional shape of the structure 160 (including dimensional design), various combinations capable of giving different amounts of optical phase delay to light of each wavelength can be realized. By diversifying the cross-sectional shape of the structure 160, the number of combinations increases, and the degree of freedom in design is further improved. Further, in order to prevent polarization dependency from occurring, it is desirable that the cross-sectional shape of each of the plurality of structures 160 when being cut along a plane parallel to the x-y plane be a four-time rotationally symmetrical shape.

Figure 7:
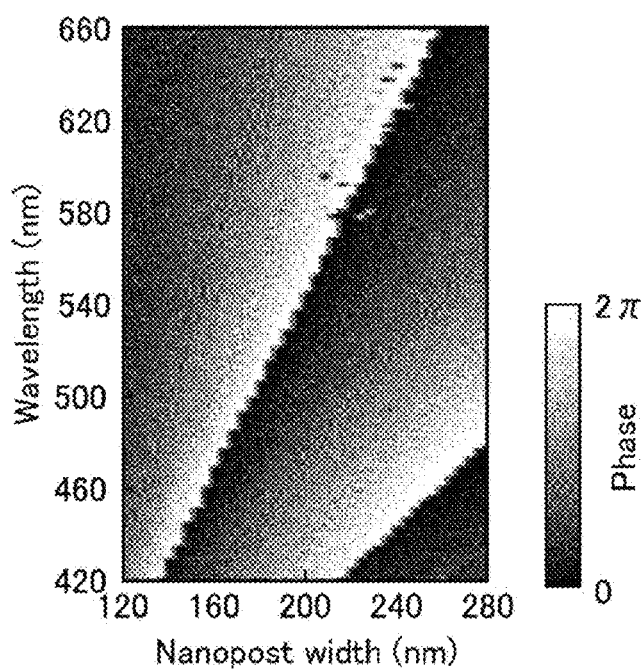
FIG. 7 is a diagram showing structure widths of a structure and the amount of phase delay at each wavelength.

[Amount of Phase Delay] Next, a structure width of the structure 160 and an amount of phase delay at each wavelength will be described. FIG. 7 is a diagram showing a relationship between a structure width of the structure 160 and an amount of phase delay at each wavelength.

In FIG. 7, the phase values at the wavelengths (420 to 660 nm) when various values are set for a structure parameter (width) of the columnar structure 160 with a constant height are shown. As shown in FIG. 7, by appropriately designing the cross-sectional shape of the structure 160, it is possible to realize all phase values of 0 to $2\pi$ at all designed wavelengths.

Thus, in the present embodiment, an arbitrary spatial phase distribution can be designed in accordance with a designed wavelength only by designing the cross-sectional shape of the structure 160 in a binary structure, and the optical element 12 having a PSF having different shapes for each wavelength can be designed as will be described later. Further, although only the wavelengths of 420 to 660 nm have been described here, the same design can be applied to any other wavelength band.

Figure 8:
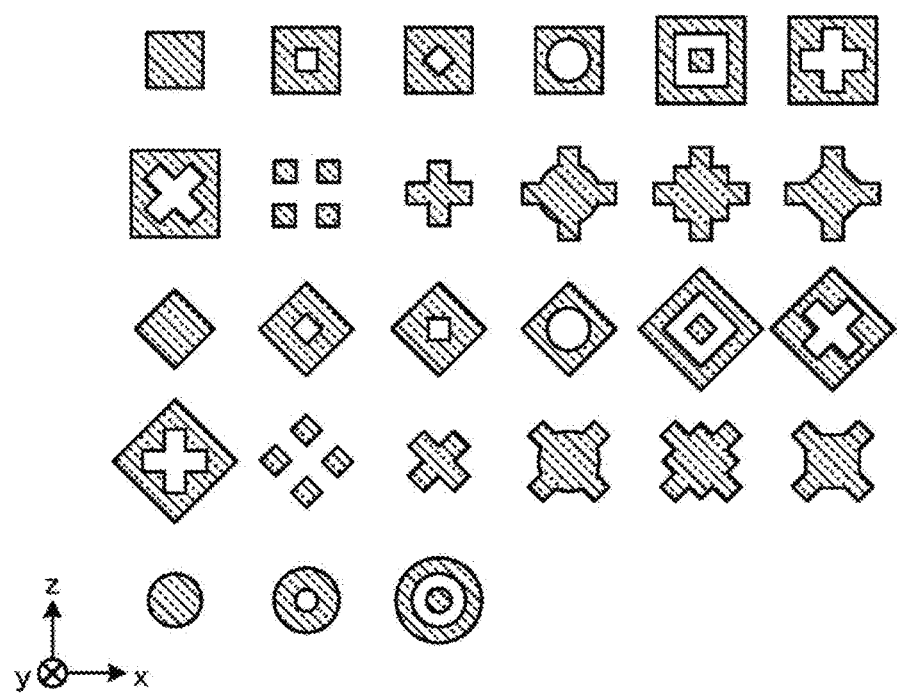
FIG. 8 is a diagram illustrating examples of cross-sectional shapes of the structure.

Further, the cross-sectional shape of the structure 160 is not limited to the shape illustrated in FIG. 6. FIG. 8 is a diagram illustrating examples of cross-sectional shapes of the structure 160. The structure 160 may have any of the various cross-sectional shapes as illustrated in FIG. 8. The exemplified shape are four-time rotationally symmetrical shapes obtained by combining various shapes of, for example, a square shape, a cross shape, and a circular shape.

[Lens Design Example 1] Next, an example of design of the optical element 12 which is a wavelength-dependent PSF lens will be described. In the present embodiment, a lens phase distribution having a PSF having a different shape for each wavelength is designed, and a columnar structure 160 is realized based on the phase distribution.

Here, a wavelength-dependent PSF lens is realized by designing the phase distribution using the structure 160 with an SiN composition illustrated in FIGS. 5 and 6. Further, a lens having a PSF having a different shape for each wavelength can be realized in various phase distributions.

As a simplest example, a case in which the optical element 12 having a different PSF for each wavelength is designed based on the phase distribution equivalent to that of a Fresnel lens will be described. In this case, the phase distribution φ of the lens is expressed by, for example, the expression (3).

[Math. 3]
$$\varphi(x, y) = -\frac{2\pi}{\lambda_d} n\left(\sqrt{x^2 + y^2 + f^2} - f\right) + C \quad (3)$$

In the expression (3), (x,y) represents spatial coordinates on the lens plane. $\lambda_d$ represents a designed wavelength. f represents a focal length. n represents a refractive index of a light propagation space after the light is transmitted through the lens. C represents an arbitrary constant.

Figure 9:
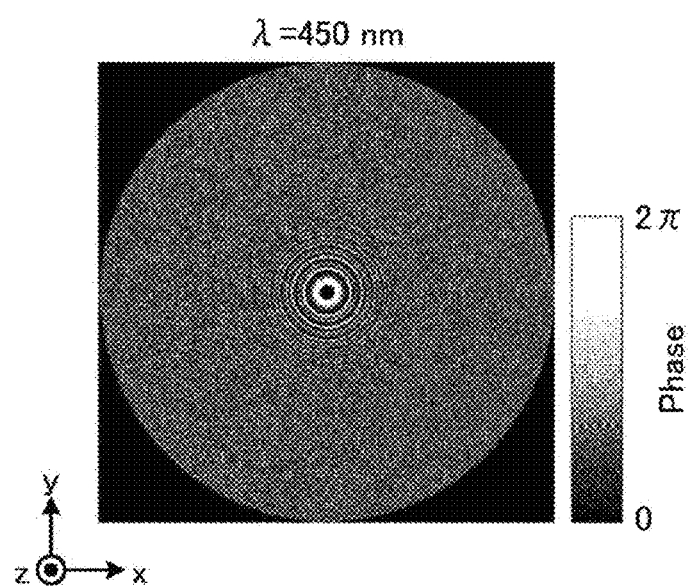
FIG. 9 is a diagram showing an example of a phase distribution of a structure when it is designed to be equivalent to a Fresnel lens.
Figure 10:
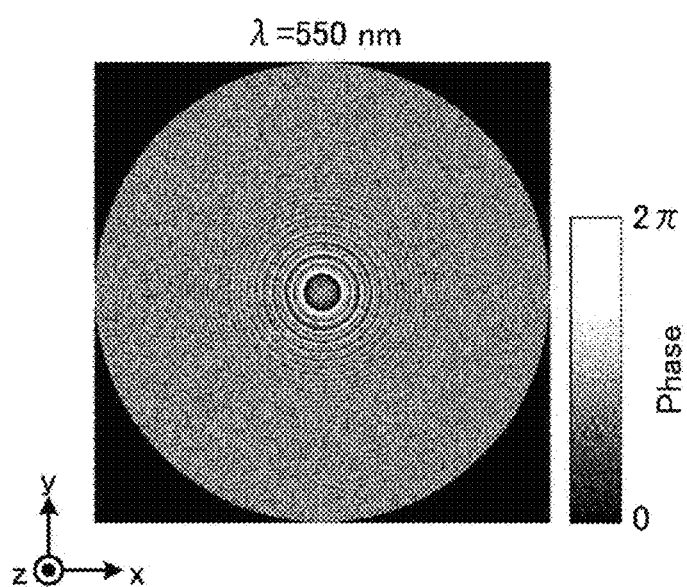
FIG. 10 is a diagram showing an example of a phase distribution of the structure when it is designed to be equivalent to a Fresnel lens.
Figure 11:
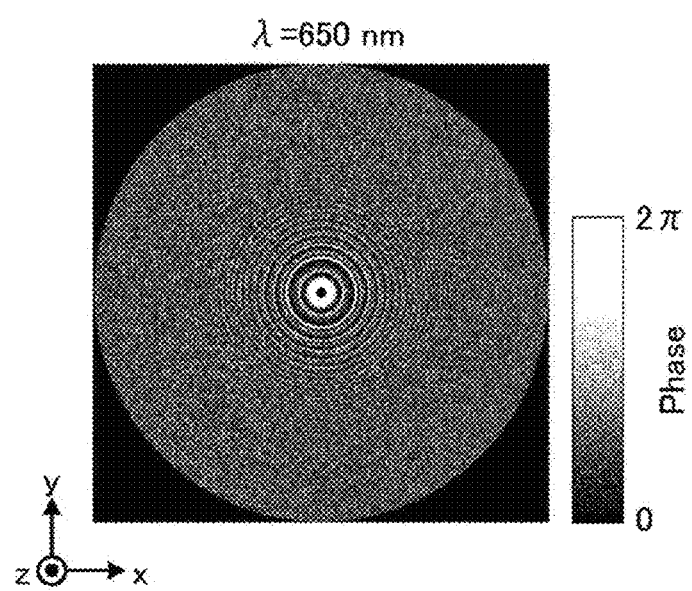
FIG. 11 is a diagram showing an example of a phase distribution of the structure when it is designed to be equivalent to a Fresnel lens.

FIGS. 9 to 11 are diagrams showing examples of the phase distribution of the structure 160 when it is designed to be equivalent to a Fresnel lens. FIGS. 9 to 11 are of examples of the phase distribution when the lens is designed to have the phase distribution equivalent to that of a Fresnel lens. FIG. 9 is of a case with a wavelength λ equal to 450 nm, FIG. 10 is of a case with a wavelength λ equal to 550 nm, and FIG. 11 is of a case with a wavelength λ equal to 650 nm. In the examples of FIGS. 9 to 11, the lens was designed to have parameters including a lens diameter of 1.0 mm, a focal length of 5.0 mm, and a designed wavelength of 520 nm. φ was converted to fall within the range of 0 to $2\pi$. For example, $-0.5\pi$ and $2.5\pi$ was converted into $1.5\pi$ and $0.5\pi$, respectively.

In order to realize a wavelength-dependent PSF lens having a phase distribution equivalent to that of a Fresnel lens, a structure 160 having a structure that is most suitable for the phase distribution of the expression (2) (the structure with minimum phase errors) is selected and arranged for each position from the amount of phase delay at the designed wavelength of the composition structure.

In the case of the phase distribution of a Fresnel lens, parallel light of a designed wavelength is condensed at one point in a focal length. That is, the PSF shape is a dot (precisely, a Gaussian function in the case of a circular lens and a sinc function in the case of a square lens).

The size of the PSF of light with other wavelengths changes depending on the wavelengths due to the wavelength dependence of the condensing position caused by the phase pattern and the wavelength dispersion with respect to the phase of the composition structure. In other words, chromatic aberration with a degree of blurring of an image varying depending on the wavelength occurs.

In the present embodiment, such chromatic aberration is utilized to perform a different convolution operation for each wavelength on an imaging target, then an image is acquired, and a spectral image can be generated through image reconstruction.

[Lens Design Example 2] Next, another design example for the optical element 12 which is a wavelength-dependent PSF lens will be described. Here, a case in which a lens is designed to have a phase distribution with a propeller-shaped PSF will be described as an example.

That is, the optical element 12 having such a phase distribution that the shape of the PSF rotates in accordance with a wavelength is designed. In this case, the phase distribution φ of the lens is expressed by, for example, the expression (4). Further, ω(θ) of the expression (4) is expressed by the expression (5).

[Math. 4]
$$\varphi(x, y) = -\frac{\omega(\theta)}{c} n\left(\sqrt{r^2 + f^2} - f\right) + C \quad (4)$$

-continued

[Math. 5]

$$\omega(\theta) = \omega_{min} + (\omega_{max} - \omega_{min})\frac{N}{2\pi}\theta \quad 0 \leq \frac{2\pi}{N}$$

$$\omega(\theta) = \omega_{min} + (\omega_{max} - \omega_{min})\frac{N}{2\pi}\left(\theta - \frac{2\pi}{N}\right) \quad \frac{2\pi}{N} \leq \theta < \frac{4\pi}{N}$$

$$\vdots \qquad \vdots$$

$$\omega(\theta) = \omega_{min} + (\omega_{max} - \omega_{min})\frac{N}{2\pi}\left\{\theta - \frac{2\pi}{N}(N-1)\right\} \quad \frac{2\pi}{N}(N-1) \leq \theta < 2\pi$$

(5)

In the expressions (4) and (5), r represents a distance from the origin on the lens plane. θ represents an angle formed by the origin on the lens plane and coordinates. c represents a speed of light in vacuum. ω(θ) represents an optical angular frequency at a position of θ. $\omega_{min}$ represents a minimum optical angle frequency in design. $\omega_{max}$ represents a maximum optical angle frequency in design. f represents a focal length. n represents a refractive index of a light propagation space after the light is transmitted through the lens. C represents an arbitrary constant. N represents the number of blades.

Figure 12:
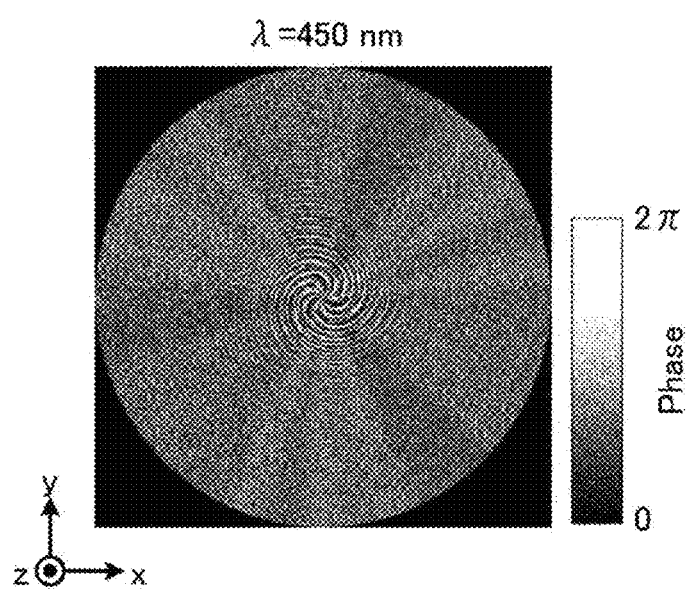
FIG. 12 is a diagram showing an example of a phase distribution of the structure when a point spread function (PSF) is designed to have a propeller shape.
Figure 13:
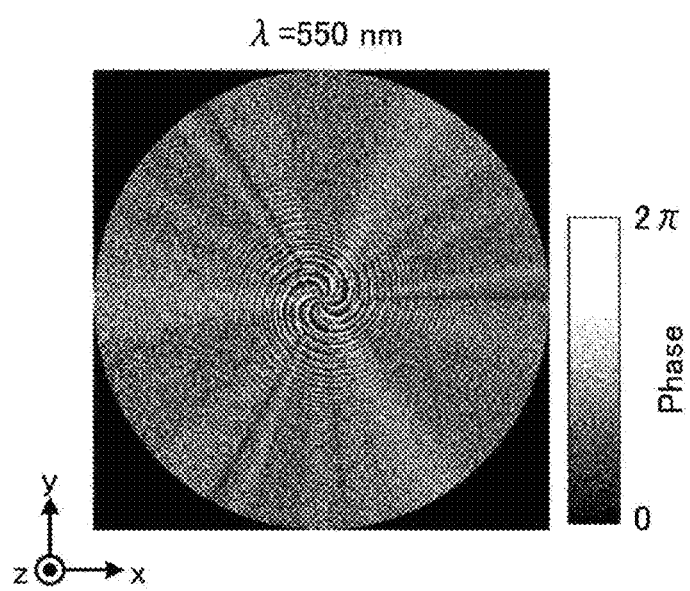
FIG. 13 is a diagram showing an example of a phase distribution of the structure when a PSF is designed to have a propeller shape.
Figure 14:
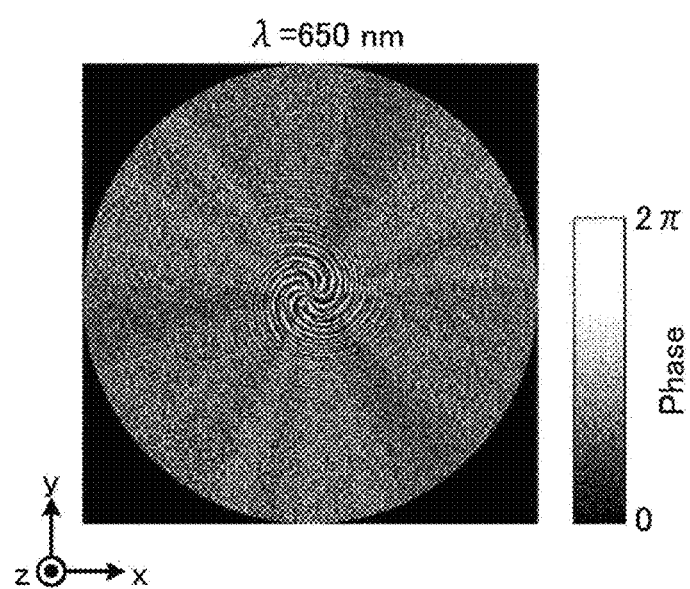
FIG. 14 is a diagram showing an example of a phase distribution of the structure when a PSF is designed to have a propeller shape.

FIGS. 12 to 14 show other examples of the phase distribution of the structure 160. FIGS. 12 to 14 are diagrams showing examples of the phase distribution of the structure 160 when the PSF is designed to have a propeller shape. FIG. 12 is of a case with a wavelength λ equal to 450 nm, FIG. 13 is of a case with a wavelength λ equal to 550 nm, and FIG. 14 is of a case with a wavelength λ equal to 650 nm. In the examples of FIGS. 12 to 14, the lens was designed to have parameters including a lens diameter of 1.0 mm, a focal length of 5.0 mm, the number of blades of 3, and a designed wavelength from 420 to 660 nm. φ was converted to fall within the range of 0 to 2π. For example, −0.5π and 2.5π was converted into 1.5π and 0.5π, respectively.

In order to realize a wavelength-dependent PSF lens having a phase distribution with a propeller-shaped PSF, the structure 160 having a structure that is most suitable for the phase distribution of the expression (the structure with minimum phase errors) is selected and arranged for each position from the amount of phase delay at each wavelength (each angular frequency) of the composition structure.

In this case, as will be described later, the shape of the PSF has a propeller-like shape, the number of blades thereof corresponds to N in the expression (5). The shape of the PSF is rotated in accordance with the wavelength, and the size thereof is hardly changed.

This is due to the phase pattern in which the focal length of the lens has dependence on a wavelength and a rotation angle θ and wavelength dispersion with respect to the phase of the composition structure. Only light at the designed angular frequency ω(θ) with an arbitrary rotation angle θ is condensed at a designed focal length and a focal position, and the focal length of the other light changes forward and backward. Since the designed angular frequency ω(θ) linearly changes according to the rotation angle θ, a PSF having a propeller shape is generated, and the PSF rotates depending on the angular frequency (wavelength).

Therefore, the optical element 12 can perform a different convolution operation for each wavelength on the imaging target, and after acquiring an image, the imaging device 10 can generate a spectral image through image reconstruction.

Further, as will be described later, a propeller lens type in which the size of the PSF is substantially constant and the wavelength dependency is generated in the clear form of rotation is more advantageous and preferable than the Fresnel type in terms of reconstruction.

Furthermore, although the designed angular frequency co changes according to the lens position according to the expressions (4) and (5), the same effect can be obtained even when the angular frequency is replaced with a wavelength.

Although the embodiment of the optical element 12 designed based on the propeller lens type is described below, the same applies to other wavelength-dependent PSF lenses such as Fresnel lens type.

Figure 15:
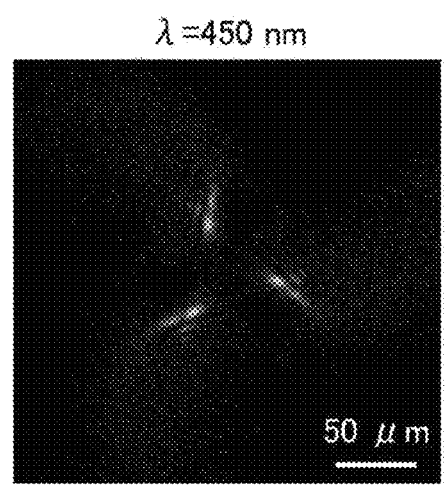
FIG. 15 is a diagram illustrating a PSF shape obtained through a Fresnel diffraction integral from the phase distributions shown in FIG. 12 to FIG. 14.
Figure 16:
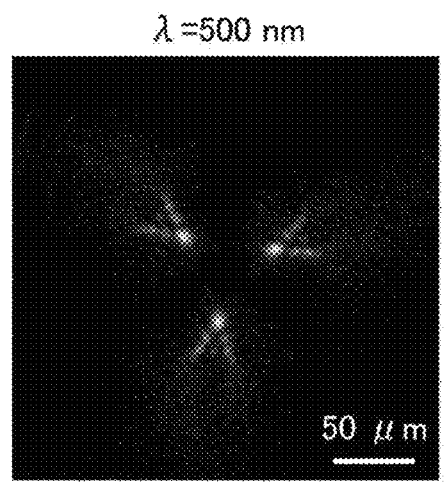
FIG. 16 is a diagram illustrating a PSF shape obtained through a Fresnel diffraction integral from the phase distributions shown in FIG. 12 to FIG. 14.
Figure 17:
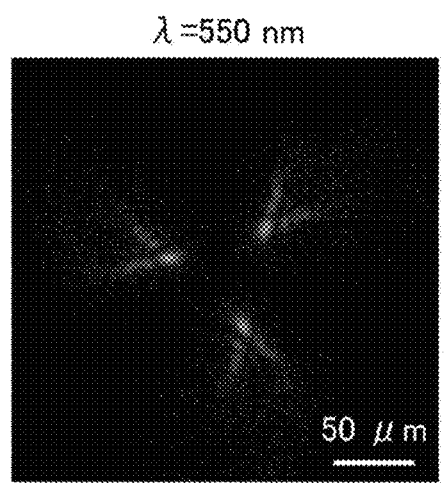
FIG. 17 is a diagram illustrating a PSF shape obtained through a Fresnel diffraction integral from the phase distributions shown in FIG. 12 to FIG. 14.
Figure 18:
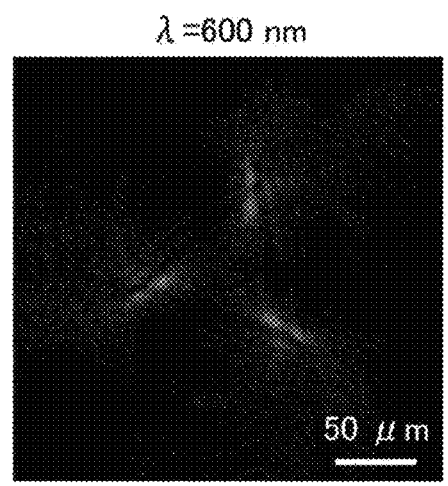
FIG. 18 is a diagram illustrating a PSF shape obtained through a Fresnel diffraction integral from the phase distributions shown in FIG. 12 to FIG. 14.
Figure 19:
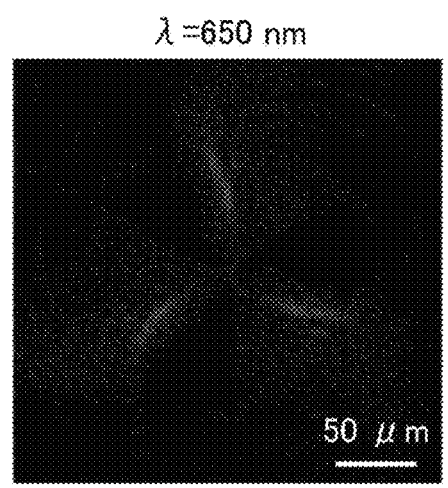
FIG. 19 is a diagram illustrating a PSF shape obtained through a Fresnel diffraction integral from the phase distributions shown in FIG. 12 to FIG. 14.

[Example of PSF Shape] Examples of PSF shape of a wavelength-dependent PFS lens in the embodiment will be shown. FIGS. 15 to 19 are diagrams showing PSF shapes obtained through a Fresnel diffraction integral from the phase distributions shown in FIGS. 12 to 14. FIG. 15 shows a PSF shape at a wavelength λ of 450 nm. FIG. 16 shows a PSF shape at a wavelength λ of 500 nm. FIG. 17 shows a PSF shape at a wavelength λ of 550 nm. FIG. 18 shows a PSF shape at a wavelength λ of 600 nm. FIG. 19 shows a PSF shape at a wavelength λ of 650 nm.

As shown in FIGS. 15 to 19, it is ascertained that the wavelength-dependent PFS lens of the embodiment has a propeller-shaped PSF having three blades rotating in accordance with a wavelength. As shown in FIGS. 15 to 19, the size of the PSF itself does not substantially change regardless of change of the wavelength.

When an imaging target 1 is captured by the optical element 12 having such PSFs, the result obtained by convoluting the image with the PSFs of the corresponding wavelength is imaged on the image sensor.

Figure 20:
FIG. 20 shows diagram of simulation results.
Figure 20:

[Example of Observation Image] Next, a simulation result obtained by imaging a natural image with the optical element 12 having any PSF shown in FIGS. 15 to 19 will be described. FIG. 20 is a diagram showing the simulation result.

The simulation was performed by performing a convolution operation on a disclosed spectral image (ICVL, Boaz Arad and Ohad Ben-Shahar, "Sparse Recovery of Hyperspectral Signal from Natural RGB Images", In European Conference on Computer Vision, pp. 19-34, Springer, 2016, [online] [retrieved on Dec. 28, 2020], Internet <URL:://icvl.cs.bgu.ac.il/hyperspectral/>) for each wavelength with any PSF of FIGS. 15 to 19 in (a wavelength of 420 nm to 660 nm: 25 band) and performing integration along the wavelength dimension in consideration of the sensitivity of RGB pixels of a general color image sensor. Further, FIG. 20 shows RGB color images displayed in monochrome, and the left image is an input spectral image (actual image), and the right image is an image obtained on the imaging sensor 11 (observation image).

These images correspond to those obtained by performing imaging using a lens having any PSF of FIGS. 15 to 19 and a color image sensor and simulating an RGB color image (observation image) output from the sensor. Further, the wavelength range of blue (B) light is from 420 to 500 nm, the wavelength range of green (G) light is from 500 to 600 nm, and the wavelength range of red (R) light is from 600 to 660 nm.

As shown in FIG. 20, it is ascertained that the observation image is blurred by the convolution operation by the PSF of the optical element 12. Further, the amount of observed information is compressed to 12% of the actual image (three colors from 25 wavelength bands), and the information is restored from three colors to 25 wavelength bands by image reconstruction based on the compressive sensing.

Figure 21:
FIG. 21 is a diagram showing an example of an image reconstructed the imaging device.
Figure 21:

[Restructured Image] Next, an example of a reconstructed image by the imaging device 10 will be described. FIG. 21 is a diagram showing an example of a reconstructed image by the imaging device 10. FIG. 21 shows an example in which a spectral image is generated from the observation image shown in FIG. 20 by using reconstruction processing based on compressive sensing.

Here, SSTV was used as a regularization term, and ADMM was used as a solution to the optimization problem. In addition, FIG. 21 also shows an actual image for comparison. Further, although the reconstructed image and the actual image shown in FIG. 21 are spectral images of 25 bands, they are obtained by monochrome display of RGB images for visualization.

The reconstructed images were evaluated with the evaluation indices of Peak Signal-to-Noise Ratio (PSNR), Structural Similarity (SSIM), and Spectral Angle Mapping (SAM).

PSNR is an index for evaluating the difference between pixels as shown in the expressions (6) and (7), and the higher the image quality is, the larger the value (dB) is. The PSNR of the image at each wavelength was calculated, the average thereof was acquired for all of the wavelengths, and it was applied to the spectral images.

[Math. 6]

$$PSNR = 10 \cdot \log_{10} \frac{MAX_I^2}{MSE} \qquad (6)$$
$$= 20 \cdot \log_{10} \frac{MAX_I}{\sqrt{MSE}}$$

[Math. 7]

$$MSE = \frac{1}{mn} \sum_{i=0}^{m-1} \sum_{j=0}^{n-1} [I(i,j) - K(i,j)]^2 \qquad (7)$$

SSIM represents structural similarity and is an index including a correlation with surrounding pixels, as shown in expression (8). As the SSIM has a value closer to 1, the image quality becomes higher. The SSIM of the image at each wavelength was calculated, the average thereof was acquired for all of the wavelengths, and it was applied to the spectral images.

[Math. 8]

$$SSIM(x,y) = \frac{(2\mu_x\mu_y + c_1)(2\sigma_{xy} + c_2)}{(\mu_x^2 + \mu_y^2 + c_1)(\sigma_x^2 + \sigma_y^2 + c_2)} \qquad (8)$$

SAM represents a wavelength spectrum similarity, and as it has a value closer to 0, the spectra become more similar. The SAM of each pixel was calculated, the average thereof was acquired for all of the images, and it was applied to the spectral images.

The reconstructed image had a PSNR of 29.09 dB, an SSIM of 0.9142, and an SAM of 0.1872. Therefore, it is ascertained that the image was reconstructed with high accuracy by the imaging device 10.

Figure 22:
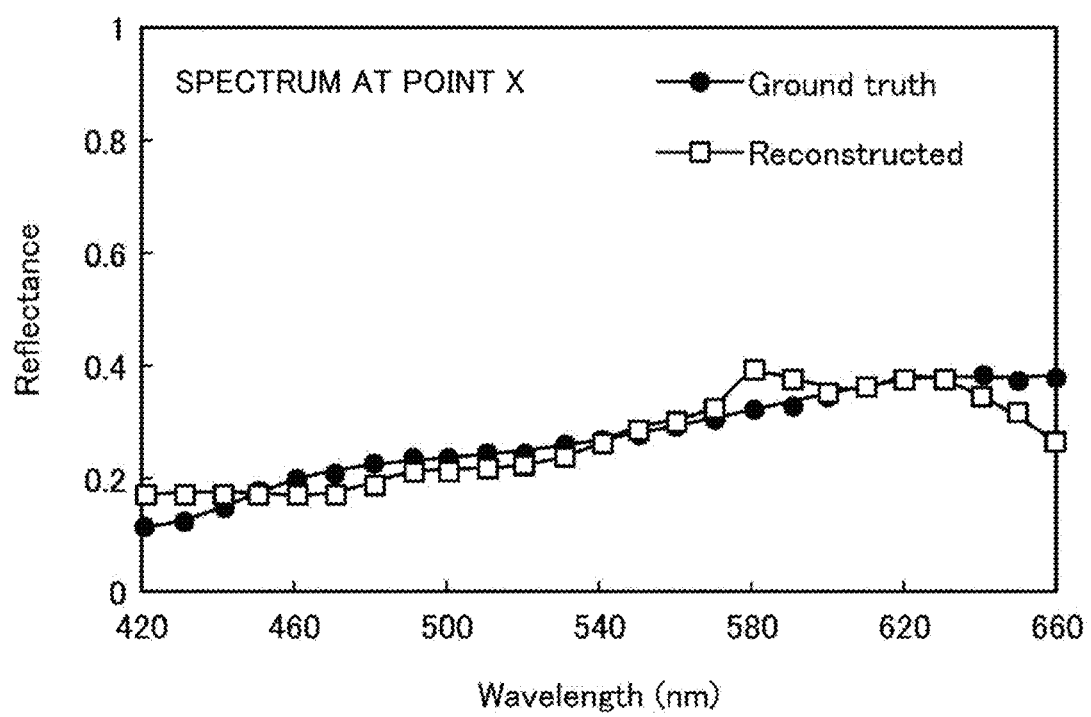
FIG. 22 is a diagram showing the wavelength spectrum at a point X of the reconstructed image of FIG. 21.

[Reconstructed Wavelength Spectrum] Next, an example of a reconstructed wavelength spectrum will be described. FIG. 22 is a diagram showing a wavelength spectrum at a point X of the reconstructed image of FIG. 21. FIG. 22 also shows a wavelength spectrum at the point X of the actual image (Ground truth) together with the reconstructed image (Reconstructed) for comparison.

As shown in FIG. 22, it is ascertained that the reconstructed image had a spectrum which was well coincident with the actual image and highly accurate information can be restored through the image reconstruction. Further, the reconstruction accuracy varies depending on the shape of the PSF of the optical element 12, and also depending on the way of solving the regularization term and the optimization problem.

[Comparison of Reconstruction Accuracy Using Shape of PSF]

Figure 24:
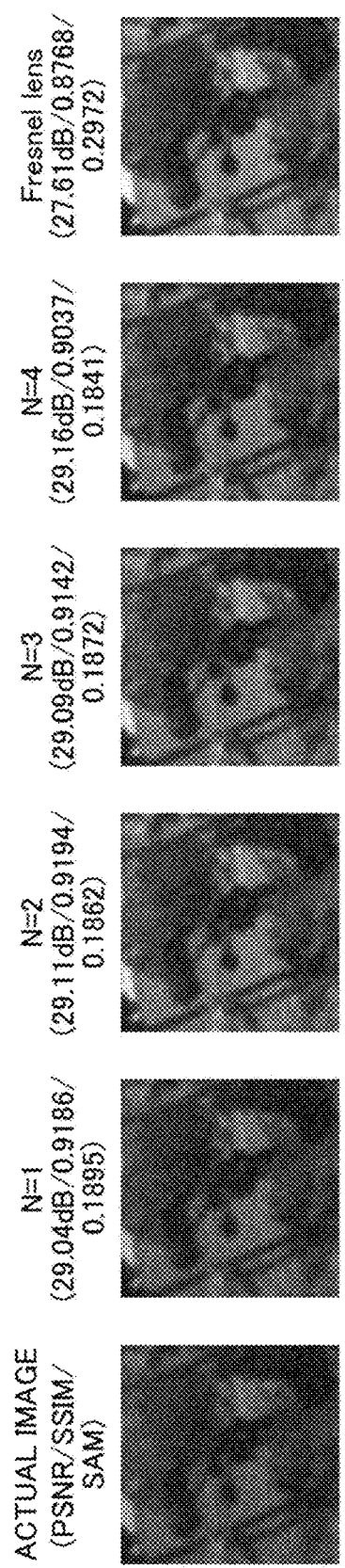
FIG. 24 is a diagram showing reconstructed images reconstructed based on the observed image with each shape of the PSF of FIG. 23.

Next, the results of comparison of the reconstruction accuracy of the optical element 12 based on the shape of the PSF are shown. FIG. 23 is a diagram showing the results of comparison of the reconstruction accuracy according to shapes of the PSF of the optical element 12. FIG. 24 is a diagram showing reconstructed images respectively reconstructed based on the observation image of each shape of the PSF of FIG. 23. The reconstructed images, the actual image and the Fresnel lens image shown in FIG. 24 are obtained by monochrome display of an RGB image.

FIG. 23 also shows the image of a Fresnel lens type PSF for comparison. In addition, FIG. 24 also shows the actual image and the reconstructed image in a Fresnel lens type for comparison. The image of the Fresnel lens type was reconstructed by utilizing the above-mentioned large chromatic aberration.

In FIGS. 23 and 24, PSNR, SSIM, and SAM were used as evaluation indices. In FIGS. 23 and 24, N represents the number of blades. FIG. 23 also shows shapes of the PSF of the optical element 12 serving as a wavelength-dependent PSF, and the shape of the PSF when the number N of blades is 1 to 4. Further, the parameters of the lens have a lens diameter of 1.0 mm, a focal length of 5.0 mm, and a designed wavelength band of 420 to 660 nm. With respect to sensor parameters, the pixel size was 24 µm, the image size was 128×128×25, and the patch size was 32×32×3. With respect to ADMM parameters, the weight of the regularization term λ was 0.015, the weight of the penalty term ρ was 0.1, and the number of iterations was 64.

As shown in FIGS. 23 and 24, all of the evaluation indexes exhibited higher accuracy than the PSF of the Fresnel lens, without having a large difference due to the number of blades. In other words, the optical element 12 exhibited higher accuracy than the PSF of the Fresnel lens, regardless of the number of blades. Therefore, it can be said that the optical element 12 according to the present embodiment is more suitable than the Fresnel lens type and constitutes an observation matrix advantageous for reconstruction.

Effects of Embodiment

Thus, in the imaging device 10 according to the embodiment, the image optically encoded by the single optical element 12 is formed on the imaging sensor 11. In other words, in the imaging device 10, the single optical element 12 can perform effective encoding in the spectral image reconstruction. For this reason, the constituent elements of the imaging device 10 may be only one optical element 12, the imaging sensor 11, and the signal processing unit 13, and can realize a hyperspectral imaging device with the simple devices.

Furthermore, since the distance between the optical element 12 and the imaging sensor 11 is determined based on the focal length of the lens in the imaging device 10, similarly to a normal imaging device, the size of the imaging device 10 is equivalent to that of a normal camera with the same field-of-view F number, and the device size can be further reduced, compared to the related art.

Then, the optically encoded image is subject to appropriate signal processing by the signal processing unit 13 when an observation process is known (here, wavelength sensitivity characteristics of the PSF of the optical element 12 and a sensor), and thus information of the actual image can be restored with high accuracy.

Furthermore, since the imaging device 10 can perform imaging itself (acquisition of an encoded image) through a single shot, it can have a time resolution equivalent to that of a normal camera, excluding a reconstruction processing time without sacrificing the time dimension.

In addition, since the optical element 12 of the imaging device 10 that is responsible for encoding is constituted in a fine binary structure, manufacturing man-hour can be reduced, the thickness becomes thinner, the weight becomes lighter, and thus the manufacturing becomes easier, compared to a general diffraction optical element requiring multistage lithography.

Furthermore, the optical element 12 having a fine binary structure has no reduction in light transmittance and no limitation on the maximum lens numerical aperture (NA) caused by the shadow effect generated in a general diffraction optical element (the phenomenon that diffracted light by the diffraction optical element is reflected and scattered by its own multi-stage structure), and therefore, a lens having a higher NA (a bright lens with higher light utilization efficiency) can be realized.

Further, although the present embodiment shows an example based on the case in which the imaging sensor 11 is a color image sensor, the same applies to the case of a monochrome image sensor, except that 3ch (RGB: color) is 1cb (monochrome) when acquiring an encoded image.

[Example of Lens Structure] The optical element 12 is not limited to having the above configuration illustrated in FIGS. 2 and 3, and may take various forms in terms of number, spacing, structural shape, and arrangement pattern of the structures 160. Furthermore, the structures 160 may be connected to each other or may be embedded in a transparent material.

Although the optical element 12 is formed on the bottom surface of the transparent substrate 190 in FIGS. 2 and 3, it is not limited thereto. FIGS. 25 to 30 are diagrams schematically illustrating another example of a part of a cross section of the optical element 12 according to the embodiment.

Figure 25:
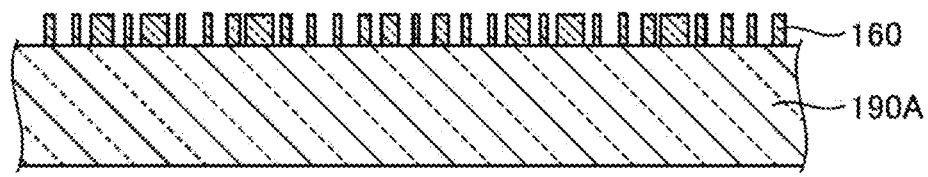
FIG. 25 is a diagram schematically illustrating another example of a part of a cross section of the optical element according to the embodiment.

As illustrated in FIG. 25, the structures 160 of the optical element 12 may be formed on the upper surface of a transparent substrate 190A. In this case, the structures 160 are supported by the transparent substrate 190A. The transparent layer above the structures 160 may be a protective layer such as air or a resin, and the transparent layer may be formed of a single material or a plurality of layered materials.

Figure 26:
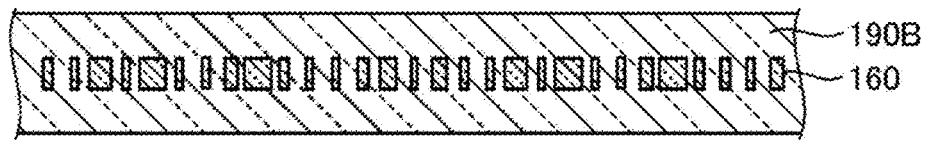
FIG. 26 is a diagram schematically illustrating another example of a part of a cross section of the optical element according to the embodiment.

In addition, as illustrated in FIG. 26, the structures 160 of the optical element 12 may be embedded in a transparent substrate 190B. The transparent substrate 190B may be formed of a single material or a plurality of layered materials.

Figure 27:
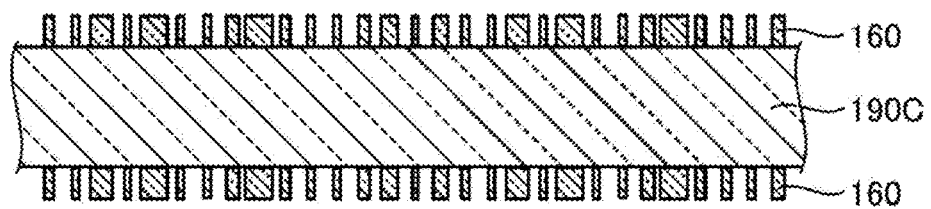
FIG. 27 is a diagram schematically illustrating another example of a part of a cross section of the optical element according to the embodiment.

In addition, as illustrated in FIG. 27, the structures 160 of the optical element 12 may be formed on the both surface of a transparent substrate 190C. The above-mentioned function of a wavelength-dependent PSF may be realized by the structures 160 on both surfaces of the transparent substrate 190C. Furthermore, the function of the wavelength-dependent PSF may be realized by the structures 160 of the transparent substrate 190C, and other optical functions such as a filter, a splitter, a light shielding layer, or the like may be realized on another single surface. The transparent layer above the structures 160 may be a protective layer such as air or a resin, and the transparent layer may be formed of a single material or a plurality of layered materials.

Figure 28:
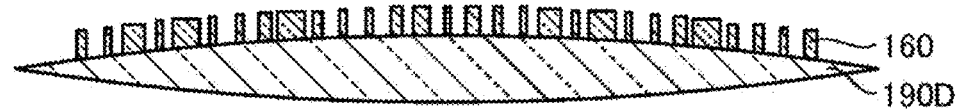
FIG. 28 is a diagram schematically illustrating another example of a part of a cross section of the optical element according to the embodiment.

In addition, as illustrated in FIG. 28, the structures 160 of the optical element 12 may be formed on a refractive lens 190D. The structures 160 are supported on the refractive lens 190D. The refractive lens 190D is useful in improving the condensing performance of the function of the wavelength-dependent PSF (achieving a high NA, etc.). Further, this also applies to refractive lenses 190E and 190F to be described below. A transparent layer above the structures 160 may be a protective layer of air or a resin. The refractive lens 190D may be formed of a single material or a plurality of layered materials.

Figure 29:
FIG. 29 is a diagram schematically illustrating another example of a part of a cross section of the optical element according to the embodiment.

In addition, as illustrated in FIG. 29, the structures 160 of the optical element 12 may be embedded inside a refractive lens 190E. The refractive lens 190E may be formed of a single material or a plurality of layered materials.

Figure 30:
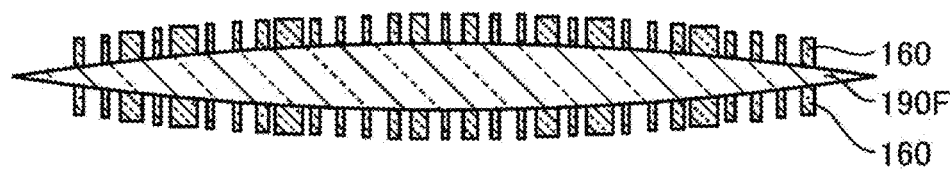
FIG. 30 is a diagram schematically illustrating another example of a part of a cross section of the optical element according to the embodiment.

In addition, as illustrated in FIG. 30, the structures 160 of the optical element 12 may be formed on both surface of a refractive lens 190F. The above-mentioned function of the wavelength-dependent PSF may be realized by the structures 160 on both surfaces of the refractive lens 190F. Furthermore, the function of the wavelength-dependent PSF may be realized by the structures 160 of the refractive lens 190F, and other optical functions such as a filter, a splitter, a light shielding layer, or the like may be realized on another single surface. A transparent layer above the structures 160 may be a protective layer of air or a resin. The refractive lens 190F may be formed of a single material or a plurality of layered materials.

In addition, although not illustrated in FIGS. 25 to 30, a light shielding film pattern or the like may be formed on the same plane or on the back surface.

Further, in the above embodiment, $TiO_2$ and SiN are described as the materials of the structures 160. However, materials of the structures 160 are not limited thereto. For example, for light having a wavelength of 380 nm to 1000 nm (visible light to near-infrared light), SiC, $TiO_2$, GaN, or the like may be used as a material of the structures 6, in addition to SiN. These materials are suitable because they have a high refractive index and low absorption loss. When being used for light having a wavelength of 800 to 1000 nm (near-infrared light), Si, SiC, SiN, $TiO_2$, GaAs, GaN, and the like may be used as a material of the structures 6. These materials are suitable because of low loss. For light in the near-infrared region (communication wavelength of 1.3 μm, 1.55 μm, etc.) in the long wavelength band, InP or the like can be used as a material of the structures 160 in addition to the above-mentioned materials.

In addition, when the structures 160 are formed by pasting, coating, etc., polyimide such as fluorinated polyimide, benzocyclobutene (BCB), a photocurable resin, a UV epoxy resin, an acrylic resin such as PMMA, a polymer such as a general resist, etc. can be exemplified as materials.

In addition, although the example in which $SiO_2$ and an air layer are assumed as the materials of the transparent layer 150 in the above embodiment, the present invention is not limited thereto. Any material having a refractive index lower than that of the material of the structures 160, including a general glass material, and having low loss with respect to the wavelength of incident light may be used. Since the transparent layer 150 may have sufficiently low loss for the wavelength of light to reach a corresponding pixel, it may be made of the same material as the color filter, and may be made of an organic material, for example, a resin.

In addition, in the above embodiment, although the three primary colors R, G and B are taken as examples as the colors corresponding to the pixels, the pixels may correspond to near-infrared light and light having a wavelength other than the three primary colors (for example, infrared light or ultraviolet light).

In addition, in the embodiment, structures having a square cross-sectional shape are used for the shape of the structures 160. This shape is an example, and one kind of structure (for example, only a square shape) may be used, or two or more kinds of structures (for example, only a square shape and an X shape) may be used.

Although the present invention has been described above based on a specific embodiment, it is needless to say that the present invention is not limited to the above-described embodiment and can be variously modified without departing from the gist thereof.

REFERENCE SIGNS LIST

1 Imaging target
10 Imaging device
11 Imaging sensor
12 Optical element
13 Signal processing unit
130 Pixel
150 Transparent layer
160 Structure
180 Wiring layer
190, 190A to 190C Transparent substrate
190D to 190F Refractive lens

The invention claimed is:

1. An imaging device comprising:
an optical element including a transparent substrate and a plurality of structures disposed on or in the transparent substrate in a plane direction of the transparent substrate;
an imaging sensor in which a plurality of pixels each including a photoelectric conversion element are arranged; and
a signal processing unit configured to generate an image signal based on an electric signal obtained from the imaging sensor, wherein
the optical element outputs light with a different point spread function for each wavelength to form, on the imaging sensor, an image in which the point spread function of each wavelength is convoluted, wherein the point spread functions corresponding to different wavelengths have shapes that vary in rotational orientations as a function of the wavelength,
the plurality of structures have the same height in a side view, and
the signal processing unit reconstructs an image in which the point spread function of each wavelength is convoluted.

2. The imaging device according to claim 1, wherein the signal processing unit reconstructs an image based on a matrix defined by an imaging process of the optical element and an image in which the point spread function of each wavelength is convoluted.

3. The imaging device according to claim 2, wherein the signal processing unit uses a model constituted by a neural network to solve an optimization problem that has, as an input, a matrix defined by an imaging process of the optical element and an image in which a point spread function of each wavelength is convoluted.

4. The imaging device according to any one of claim 1, wherein
each of the plurality of structures is a columnar structure having a refractive index higher than a refractive index of the transparent substrate or a transparent layer formed on the imaging sensor and giving an amount of an optical phase delay corresponding to a cross-sectional shape to incident light, and
the plurality of structures have a cross-sectional shape set according to an amount of an optical phase delay distribution for realizing formation of an image in which the point spread function of each wavelength for a pixel has been convoluted, and are arranged according to an amount of an optical phase delay distribution for realizing formation of an image in which the point spread function of each wavelength for the pixel has been convoluted.

5. The imaging device according to claim 1, wherein a cross-sectional shape of each of the plurality of structures is a four-time rotationally symmetrical shape.

6. The imaging device according to claim 1, wherein the plurality of structures are periodically arranged with a space period P satisfying $P<\lambda_{min}/n_0$, where $\lambda_{min}$ is a minimum wavelength in a wavelength band of light incident on the optical element, and $n_0$ is a refractive index of a medium on a transmission side of the optical element.

7. An optical element comprising:
a transparent substrate; and
a plurality of structures disposed on or in the transparent substrate in a plane direction of the transparent substrate,
the optical element configured to output light with a different point spread function for each wavelength to form, on an imaging sensor, an image in which the point spread function of each wavelength is convoluted, and the point spread functions corresponding to different wavelengths have shapes that vary in rotational orientations as a function of the wavelength, wherein
the plurality of structures have the same height in a side view.

* * * * *